Figure 1:
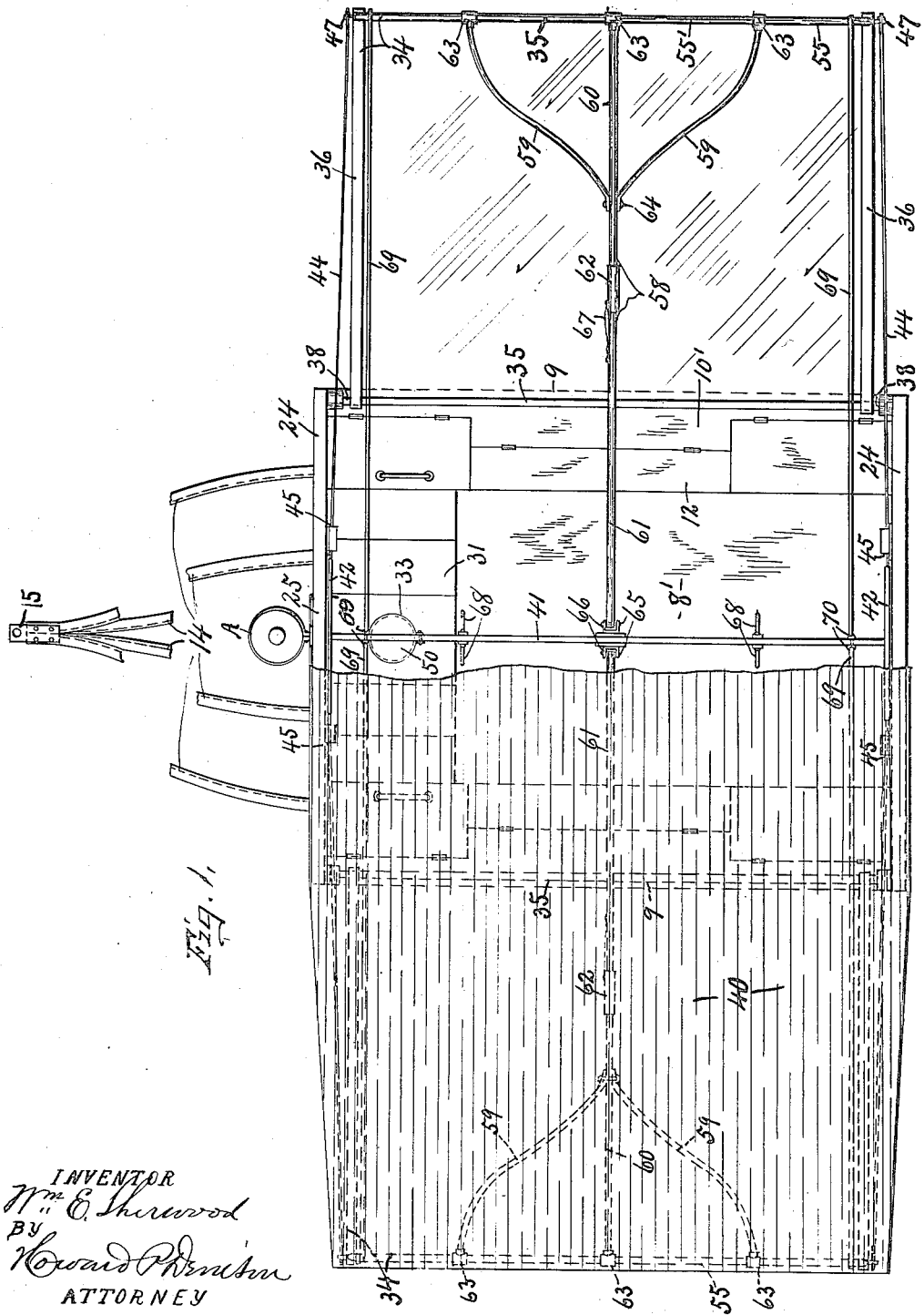

W. E. SHERWOOD.
CAMPING OUTFIT.
APPLICATION FILED APR. 28, 1920.

1,431,187.

Patented Oct. 10, 1922.
6 SHEETS—SHEET 1.

INVENTOR
Wm E. Sherwood
BY
Howard P. Denison
ATTORNEY

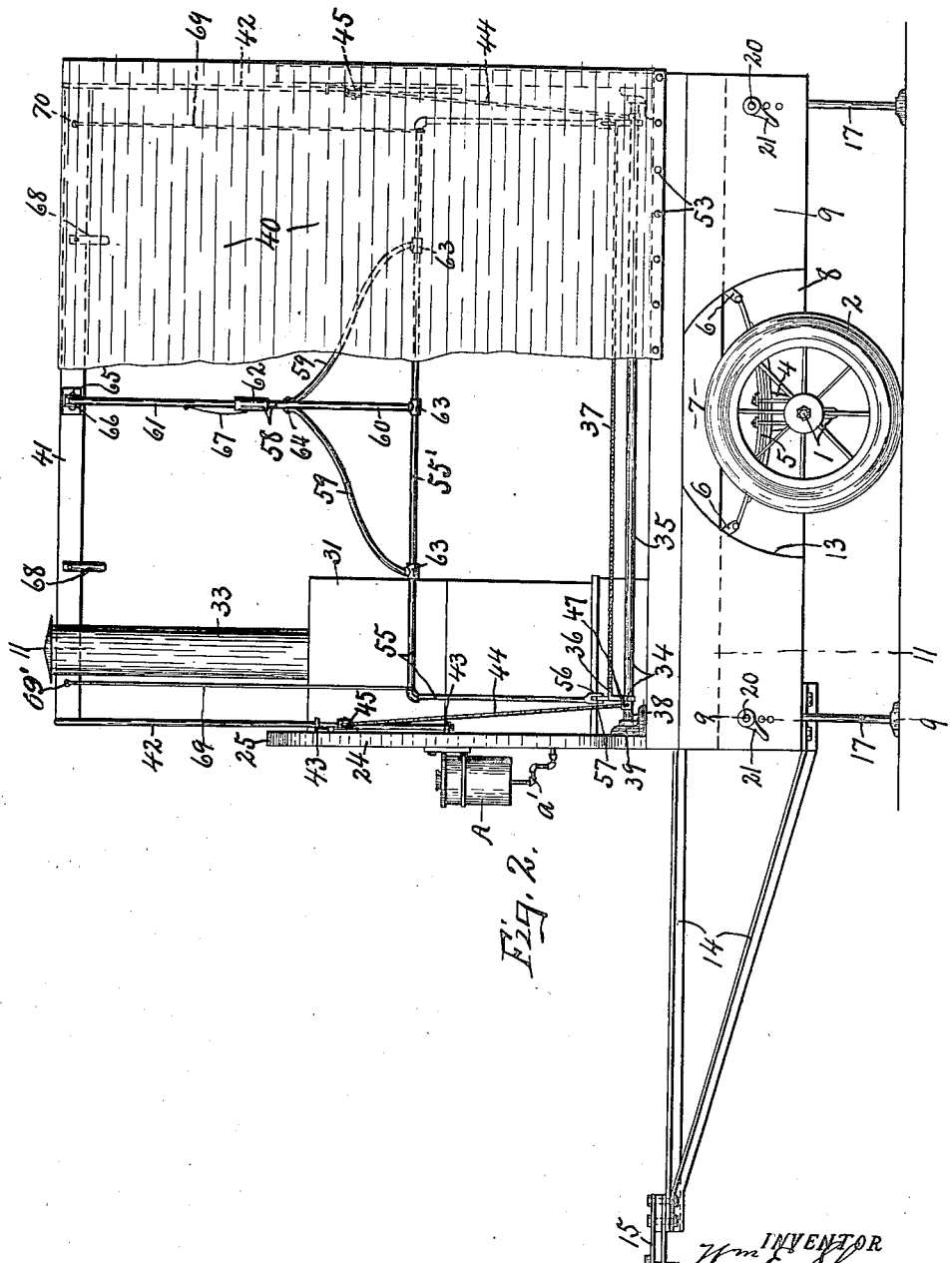

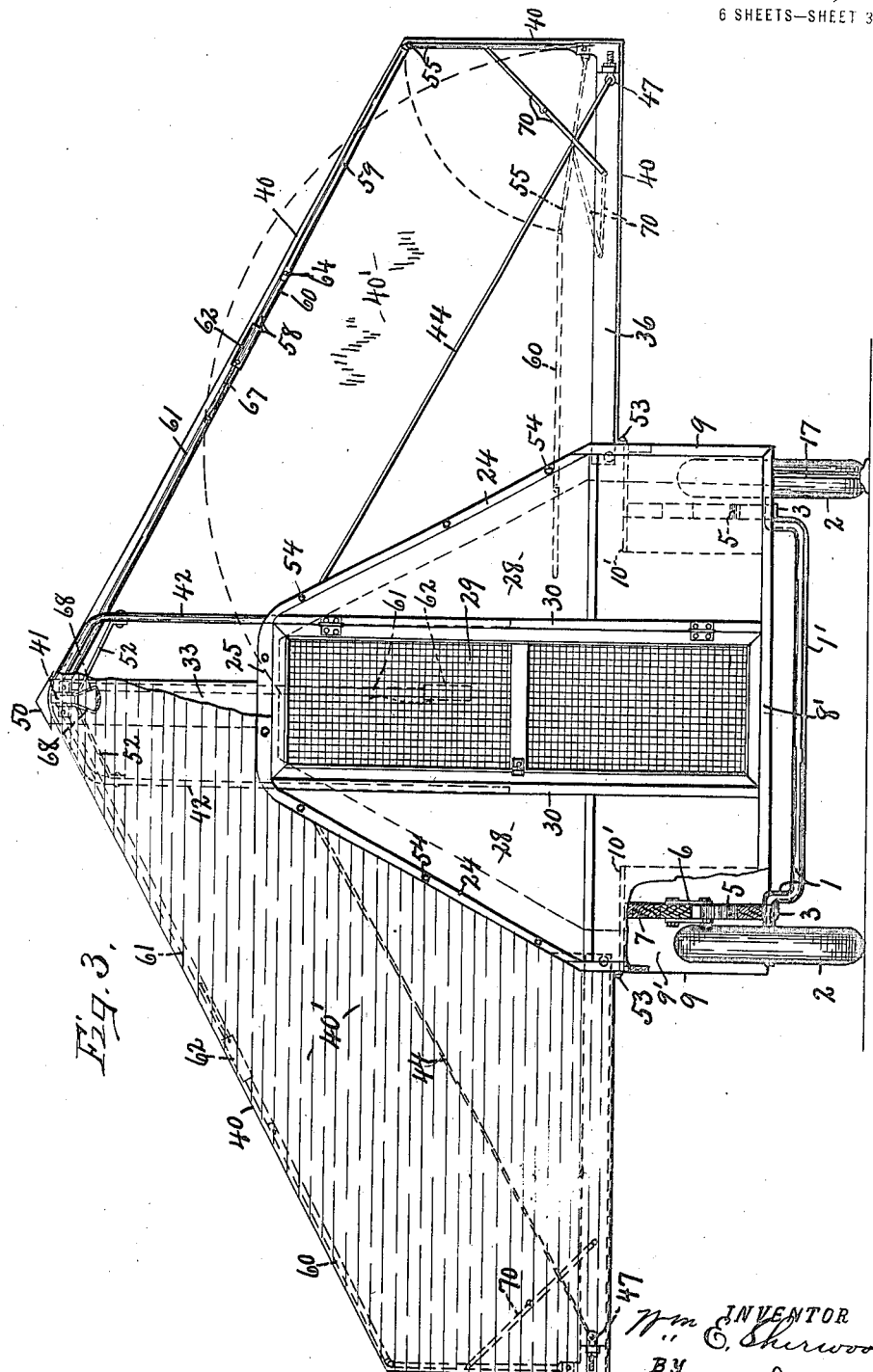

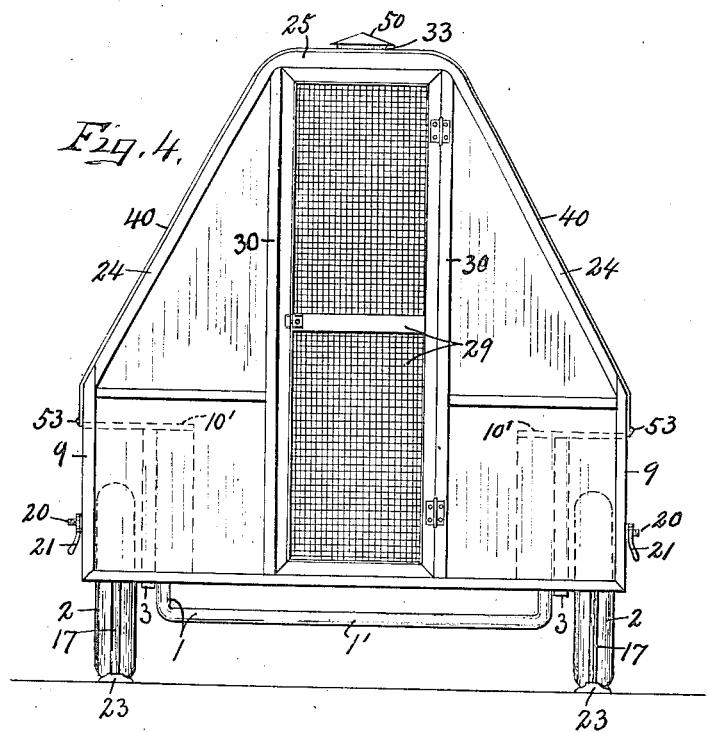

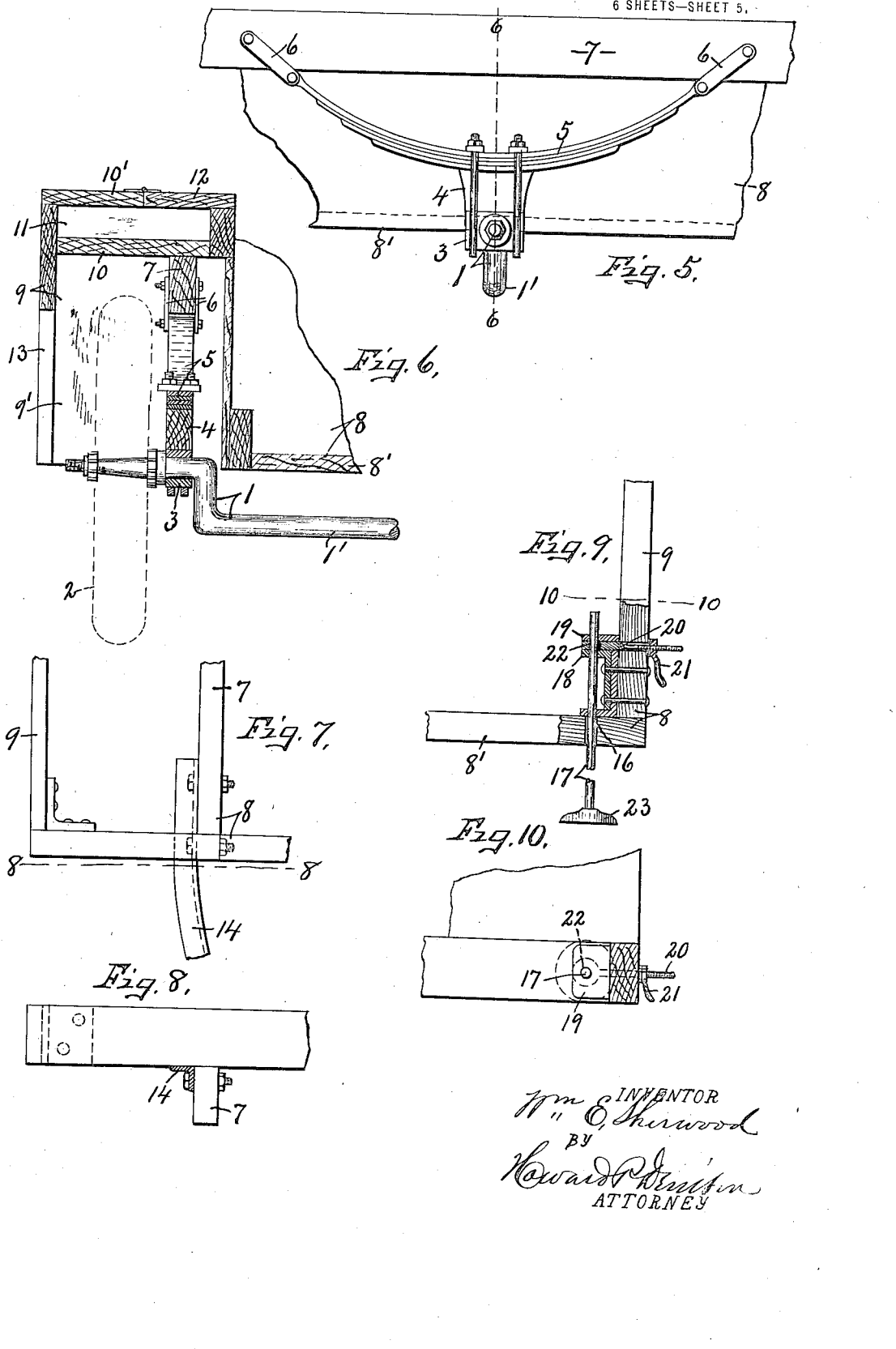

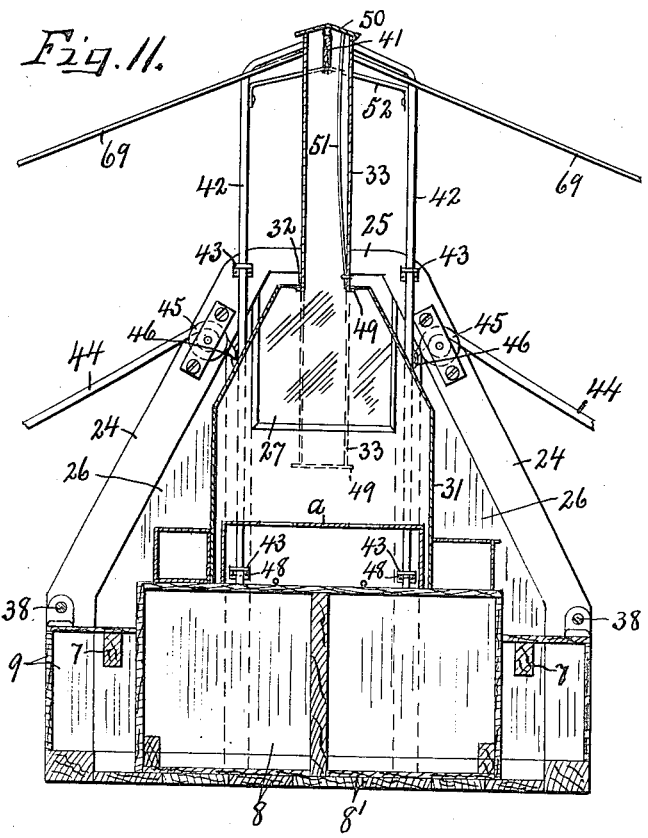
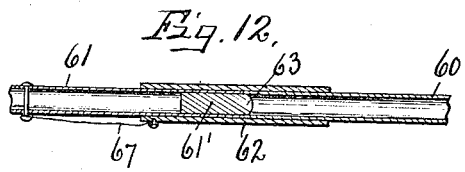
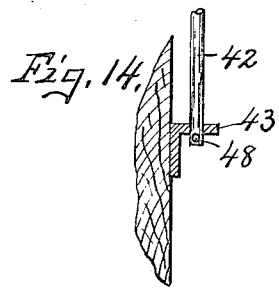
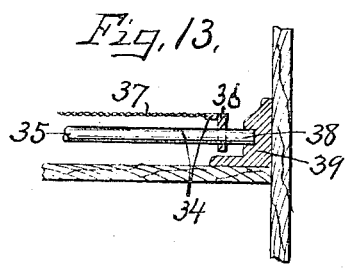

Patented Oct. 10, 1922.

1,431,187

UNITED STATES PATENT OFFICE.

WILLIAM E. SHERWOOD, OF CANASTOTA, NEW YORK, ASSIGNOR TO EDNA I. SHERWOOD, OF CANASTOTA, NEW YORK.

CAMPING OUTFIT.

Application filed April 28, 1920. Serial No. 377,253.

*To all whom it may concern:*

Be it known that I, WILLIAM E. SHERWOOD, of Canastota, in the county of Madison, in the State of New York, have invented new and useful Improvements in Camping Outfits, of which the following, taken in connection with the accompanying drawings, is a full, clear, and exact description.

This invention relates to a camping outfit having supporting wheels and means of attachment to an automobile or other road vehicle, whereby it may be conveniently transported from place to place as a trailer and set up in any desired locality.

Aside from the main object of convenience of transportation, another object is to provide the body of the trailer with a pair of mattress supporting frames hinged to opposite sides of the body to fold in upwardly converging planes and to unfold to substantially horizontal positions in a plane above the wheels and, therefore, clear of the ground, whereby the occupants are protected from dampness and other objectionable elements.

A further object is to provide a flexible covering for the mattress supporting frames mounted in such manner that it may be folded and unfolded with the folding and unfolding of the frames and when unfolded will afford ample space for movement of the occupants on the mattress upon the frames without contact with the top.

A further object is to provide means actuated by the mattress supporting frames for raising and lowering the central portion of the covering as the frames are unfolded and folded, respectively.

A still further object is to provide the body of the trailer with compartments for the reception of various utensils commonly used in camping outfits, and to also install in one end of the body a suitable cooking stove, preferably of the gasoline type having its source of supply suspended at a higher elevation and at the exterior of the body for safety and convenience of refilling.

Other objects and uses relating to specific parts of the outfit as a whole will be brought out in the following description:

In the drawings:

Figure —1— is a top plan of a camping outfit trailer embodying the various features of my invention, a portion of the cover and part of the tongue being broken away, the mattress supporting frames being unfolded or extended for use.

Figure —2— is a side elevation of the apparatus shown in Figure —1—, showing a portion of the cover as broken away.

Figure —3— is a rear end elevation of the same apparatus except that a part of the cover is broken away and a portion of one side of the body shown in section.

Figure —4— is a rear elevation of the same apparatus with the mattress supporting frames and cover folded and ready for moving except that the adjustable legs are shown in operative position.

Figure —5— is an enlarged side elevation of a portion of the body and axle showing the spring connection between said axle and body.

Figure —6— is a transverse sectional view through one side of the body taken on line 6—6, Figure —5—.

Figure —7— is a top plan (enlarged) of a portion of the front end of the body and adjacent portion of the tongue showing more particularly the members of the body frame and manner of attaching the tongue thereto.

Figure —8— is a sectional view taken on line 8—8, Figure —7—.

Figure —9— is an enlarged sectional view taken on line 9—9, Figure 2.

Figure —10— is a horizontal sectional view taken in the plane of line 10—10, Figure —9—.

Figure —11— is a transverse sectional view taken on line 11—11, Figure —2—.

Figure —12— is a detail sectional view of the adjoining ends of the brace bar for holding one of the mattress supporting frames and cover in their unfolded position.

Figure —13— is a detail sectional view of one of the hinge connections for one of the mattress supporting frames.

Figure —14— is a detail sectional view of one of the limiting stops for the ridge beam supports.

As illustrated, this camping outfit trailer comprises an axle —1— having a pair of supporting wheels —2— journaled on opposite ends thereof, the portions of the axle at the inner ends of the hubs of the wheels being journaled in bearings —3— which are secured to the undersides of suitable spring-supporting blocks —4—.

The portion of the axle —1— between the bearings —3— is depressed or U-shaped forming a bar —1'— normally disposed in a plane some distance below the journal bearings —3—, where it serves as a guard to protect the underside of the body of the trailer from contact with underlying objects in the roadway and is free to swing longitudinally of said body by contact with said objects without affecting the axis of the wheels, while, at the same time, the drop of the central portion of the axle affords ample space for the vertical play of the body under the action of the springs without contact with said axle.

A pair of semi-elliptical springs —5— are mounted upon the blocks —4— to extend forwardly and rearwardly, and have their opposite ends connected by links —6— to lengthwise sills or frame bars —7— forming a part of the main body of the vehicle.

The sills —7— and their corresponding springs —5—, together with the supporting blocks —4— for said springs, are disposed in parallel vertical planes between the ends of the drop bars —1'— and the journal bearings for the wheels —2—, said sills being extended forwardly and rearwardly substantially equal distances from the vertical plane of the axis of the wheel bearings so as to support the main body of the vehicle substantially midway between its ends, thereby constituting what may be termed a two-wheel trailer with the body substantially balanced forwardly and rearwardly on the axle.

The remaining portions of the main body of the vehicle are supported directly upon the sills —7— and comprise a main central compartment —8— and lateral compartments —9— at opposite sides of the main compartment —8—, which latter extends from front to rear of the body and its width is nearly equal to the distance between the upright ends of the drop bar —1'— of the axle so that its bottom portion can play freely between the upturned ends of said drop bar.

That is, the compartment —8— extends downwardly from the upper faces of the sills —7— to approximately the horizontal plane of the axis of the wheels and is provided with a floor —8'— normally spaced above the drop bar —1'— to allow the body to move vertically under the action of the springs. The lateral compartments —9— at both sides of the main compartment —8— are substantially identical, one of them being shown more clearly in Figure —6— as provided with a wheel housing or compartment —9'— and front and rear end compartments for the reception of cooking utensils and other articles which it may be desired to carry in the trailer, each lateral extension being also provided with lower and upper shelves or partitions —10— and —10'— spaced apart one above the other above and across the vertical plane of the adjacent wheel to form a chamber —11— directly over the wheels —2— for the reception of tools and such articles as may be necessary or desirable to carry with the trailer.

The upper shelves —10'— form lengthwise seats along opposite sides of the compartment —8—, each of said shelves being provided with a hinged section or lid —12— to permit access to the chamber —11—. The outer walls of the wheel housing —9'— are provided with arched recesses —13— corresponding in diameter to that of the wheel to permit access to the latter for removal and replacement when desired.

Suitable draft bars —14— are secured to and project forwardly from the front end of the body of the trailer and constitute a tongue or draft device having means, as a clevis —15—, for attachment to the rear end of the motor vehicle or other power driven device.

The main body of the trailer is substantially rectangular in top plan and in order that it may be held against tilting movement when temporarily installed for camping purposes, the main body is provided near its four corners with vertical apertures —16— for receiving vertical adjustable legs —17—, having their upper ends passed through the flanges of suitable angle irons —18— and —19—, and each locked in their adjusted position by means of clamping bolts —20— extending through one of the upright sides of the body and engaged by nuts —21—, each bolt having an eye —22— for receiving the adjacent portion of the leg —17— and permitting it to be drawn tightly against the outer walls of the apertures in the flanges —18— and —19— when the nut —21— is tightened, and also permitting the release of the legs for vertical adjustment when the nut is loosened, each leg being provided at its lower end with a relatively broad foot —23— for engagement with the ground or other suitable support.

The front and rear ends of the main body of the trailer are provided with upwardly converging pairs of brace rails —24— of angle iron having their lower ends secured to the upper edges of the outer side walls of the extensions —9— and the upper ends of each pair united by a cross bar —25— the space between the brace bars of the front being filled in by wooden panels —26— and a window —27— to form a front wall above the shelves —10'—, while the space between the rear brace bars —24— is filled in by wooden panels —28— and a door —29—, which latter extends from the corresponding top rail —25— to the floor —8'— of the body midway between the opposite sides of the rear end of the comparement —8—, or between suitable stiles —30— forming a part of the body frame and also extending from the floor —8'— to the top bar —25—.

The window —27— is centrally located in the upper portion of the front wall just below the corresponding top bar —25—, and, together with the door —29—, which may be either glass or screen, affords sufficient light for the compartment —8— when the body is covered by a protective canvas or cover hereinafter described.

The compartment —8— extends practically the entire length of the body or between the end walls thereof, and forms a center aisle or space between the seats of considerably greater width than the width of the door, while the seats are of sufficient length to accommodate several persons on each, the space beneath the seats being utilized for the reception for various articles commonly used in camping outfits, the height of the body between the floor —8'— and top rails —25— being sufficient to allow the passage of the occupants from front to rear therethrough in an erect position.

As previously stated, the opposite sides of the body or rather the outer sides of the lateral extensions rise a short distance above the seats —10'— to form backs therefor, although the intervening space between the front and rear brace rails —24— and top bars —25— above the backs of the seats are open, thereby affording lateral exits above the seats practically the entire length of the body, which length is sufficient to accommodate any occupant lying lengthwise thereof, or substantially equal to the length of standard forms of full sided beds.

The front portion of the body is partitioned off transversely to form a series of separate chambers, one of which may be used as a receptacle for ice and articles to be kept cool, while the others may be used for various camping utensils, the tops of said chambers being disposed horizontally to form working tables with lids of any desired construction, and also for supporting a gasoline stove —a—, to which fuel is supplied from a tank —A—, which is supported on the outer face of the front wall of the body and is connected to the stove by means of a pipe —a—, as shown more clearly in Fig. 2.

A sheet metal hood —31— is supported upon the front wall of the body directly over the stove —a— to concentrate the products of combustion and vapors arising from cooking, and is provided in its top with an opening —32— for the reception of a sheet metal ventilating flue —33— extending through and above the covering for ventilating the interior of the body and is adapted to move vertically in said opening as the cover is raised and lowered in the manner hereinafter described.

A pair of full sized bedding or mattress supporting frames —34— are mounted on opposite sides of the body directly above the seats —10'— to swing vertically to and from a horizontal plane between the front and rear end walls or brace rails —24—, and, when folded, converge upwardly in approximately the same plane as the upwardly converging rails of said front and rear walls, as shown more clearly in Fig. 4, or when unfolded take the position shown in Figs. 1, 2 and 3.

These mattress supporting frames —34— are identical and interchangeable from side to side and each comprises a pair of lengthwise tubular bars —35— in parallel spaced relation, and a pair of parallel end bars —36— connecting the ends of the lengthwise bars —35—, and adapted to receive and support a spring mattress as —37— upon which the bedding may be placed.

The length of the side bars or rails —35— is slightly less than the distance between the front and rear brace rails —24— to permit the mattress supporting frames to be folded and unfolded between the front and rear walls, the inner or lower rail —35— of each mattress supporting frame having its opposite ends provided with trunnions —38— which are journaled in suitable bearings —39— on the adjacent end walls of the body just above the seats —10'—, thus permitting the remaining portions of the mattress supporting frame to swing vertically to and from a horizontal position, and also to and from an upwardly and inwardly inclined position substantially parallel with the brace rails —24— of the end walls of the body.

Suitable means is provided for raising and lowering the central portion of a flexible covering, as —40—, of canvas or other light water proof material, which is adapted to afford protection from the elements to the occupants of the body and beds when folded, or unfolded, said means being preferably rendered automatic by suitable connections with the mattress supporting frame so that the central portion of the covering will be raised when the mattress supporting frame is unfolded and lowered when the frame is folded. For this purpose, a ridge beam or bar —41— is adjustably mounted directly over the longitudinal center of the body of the trailer parallel therewith, and is rigidly secured and supported at its ends to and by a pair of inverted U-shaped members —42—, said supports being disposed in parallel vertical planes just at the inner sides of the front and rear walls of the body and have their opposite arms substantially parallel vertically, and guided in upper and lower apertured lugs —43—, which are secured to the inner faces of the upwardly converging rails —24— and end walls of the compartment —8—, respectively, for guiding said supports —42— in their vertical movement as shown in Figure 11.

Two of these guide lugs in vertical spaced relation are preferably provided for each arm of the supports —42— to enable them to move freely without binding or excessive friction in their respective guides, and also to hold the arms of each support in parallelism.

The outer portions or free edges of the mattress supporting frames are connected to the corresponding supports —42— for the ridge beam —41— by a pair of cables —44— which are passed over suitable sheaves —45— on the inner faces of the adjacent brace rails —24—, the inner ends of the cables being attached to loops —46— on the opposite arms of said supports, while the outer or lower ends of the same cables are attached to anchor eyes —47— on the mattress supporting frame at the ends and near the outer edges thereof, whereby as the mattress supporting frames are unfolded from the position shown in Fig. 4, the cables will be drawn outwardly and downwardly for elevating the supports —42— and ridge beam —41— mounted thereon, while on the other hand, when the mattress supporting frames are folded from the position shown in Fig. 3 to that shown in Fig. 4, the tension on the cable —44— will be relaxed, thereby allowing the supports —42— and ridge pole thereon to drop by their own weight it being understood that the sheaves —45— are disposed a sufficient distance above the axes of movement of the mattress supporting frames to assure an upward pull of the cables upon the supports —42— during all positions of adjustment of said frames.

Suitable means is provided for limiting the upward movement of the supports —42— for the ridge beam and thereby limiting the downward swinging movement of the outer edges of the mattress supporting frames, and for this purpose the lower ends of the opposite arms of the supports —42— are provided with stop shoulders such as pins —48— adapted to engage the underside of the lower set of lugs —43—, as shown more clearly in Fig. 14.

The ventilating flue —33— is secured at its upper end to the front end of the ridge beam —41— to move vertically therewith and has its lower end provided with an annular shoulder —49— for engagement with the underside of the top of the hood —31— to prevent its being withdrawn from operative engagement with said hood when moved vertically in the opening —32— as the ridge pole is raised and lowered, said flue being provided with an adjustable cap, which may be opened and closed by means of a wire —51—, as may be necessary for ventilation or protection against the entrance of rain or dust into the interior of the body of the trainer through the flue.

The top portions of the supports —42— preferably converge upwardly from the opposite arms of said supports and are secured in suitable recesses in the upper edge of the ridge beam which is additionally secured to the opposite arms of the supports by braces —52—, thus affording a rigid connection between the ridge pole and its supports, while the upwardly converging portions of the tops of said portion conform more closely to the upwardly converging rails —24— of the body when the ridge pole is lowered by the folding of the mattress supporting frames.

The covering —40— extends transversely over and upon the upper edge of the ridge beam —41— and around the outer edges of the mattress supporting frames, and has its ends returned inwardly under said frames and secured by buttons or other fastening means —53— to the outer faces of the sides of the body in approximately the horizontal plane of the seats —10'— or just below the upper edge of the outer sides of the extensions —9—, said covering being provided with end flaps or walls —40'— which are cut away at the centers to conform to the shape of the angle bars —24— of the body frame, the edges adjacent the angle bars being adapted to be fastened thereto by buttons —54— or equivalent fastening means.

The covering —40— including the end flaps —40'—, together with the end walls of the body of the trailer, constitute a complete enclosure for the interior of the body and bed supporting mattresses to effectively protect the occupants from the elements, and owing to the fact that the space between the end walls of the body is open at both sides, it is evident that the capacity of the body of the trailer is increased to the extent of the added area of the bed supporting mattresses when the latter are unfolded. and that when they are folded upwardly and inwardly toward each other, the covering folds therewith and effectively protects the interior of the main body against the entrance of dust, rain and other elements, without materially diminishing the interior capacity of said body by reason of the fact that the mattress supporting frames with the bedding thereon, when folded, lie in approximately the same planes as those of the upwardly converging rails —24— and the top rails —25—, or when unfolded are mainly beyond the outer sides of the main body.

In order that the mattress supporting frames and roof of the cover may be held in sufficiently spaced relation to permit the occupants to have ample freedom of movement on the mattresses, the outer side walls of the cover are held in substantially vertical positions by inverted U-shaped stay frames —55— extending longitudinally of the body nearly its full length and having the ends of their opposite arms hinged at —56— to suitable ears —57— on the end rails of the mattress supporting frame —34— in such manner as to swing inwardly and downwardly to and from a vertical position, and also to and from a horizontal position, in which latter, the top rail of each stay frame is adapted to lie upon the bedding, while the side rails are free to move across the ends of the bedding.

The means for holding the stay frames —55— in operative position consist of stay rods —58— and braces —59—, the stay rod —58— being composed of sections —60— and —61— arranged end to end and held in alinement by a sleeve —62— which is slidable to and from a position across their meeting ends, the outer end of the sections —60— and outer ends of the braces —59— being journaled at —63— upon the lengthwise rail, as —55'— of the stay frame —55—, said braces having their inner ends secured at —64— to the section —60—.

The upper or inner end of the section —61— is pivoted at —65— to a clip —66— on the central portion of the ridge beam —41—.

As shown in Fig. 12, the sections —60— and —61— are tubular, a plug —61'— being secured in the outer end of the section —61— and provided with a tapered projection —63— adapted to enter the adjacent end of the section —60— and to thereby facilitate the centering or alining of said sections, and to assist in relieving the strain upon the sleeve —62—.

A strap —67— is attached to the sleeve —62— and to the section —61— to hold the sleeve against accidental displacement when the sleeve is withdrawn and the sections —60— and —61— disconnected from each other, as for example, when the mattress supporting frames are folded upwardly and inwardly.

The ridge beam —41— is provided at intervals throughout its length with pendent downwardly and outwardly flaring rests —68— against which the outer or upper edges of the inner faces of the bedding or mattress are adapted to rest when the mattress supporting frames are folded, said rests serving to hold the bedding against sagging inwardly by keeping it more nearly in alinement with the ridge beam —41—.

The stay frames —55— of which there are two, one for each side of the cover, serve not only to hold the outer sides of the cover in an upright position, but also to tension the portions of the cover between the upper rails —55'— and ridge beam —41— in oppositely inclined planes, thereby forming a roof which is capable of shedding water without interfering with the freedom of movement of the occupants of the beds or body of the trailer, the stay-rods 58 and braces 59 also serving to support the central portion of the cover against undue inward movement, both in the folding and unfolding positions of the mattress supporting frames are adjusted for use. Additional cover supports consisting of cables or ropes —69— are attached to eyes —69'— in the ridge beam —41— and have their opposite ends secured to the top rails —55'— of the stay frames —55—.

When the mattress supporting frames are unfolded or extended for use, the stay frames —55— are held in their adjusted position by the brace rods —58— and by additionally jointed braces —70— each composed of sections hinged to each other at one end and having their other ends pivotally connected, respectively, to the adjacent end rail of the mattress supporting frame and to the adjacent upright arms of the frame —55—, as shown more clearly in Fig. 3, the joints of the brace bars —70— being adapted to be flexed inwardly and downwardly along the outer sides of the end bars of the mattress supporting frames when the stay frames —55— are released by disconnecting the sections —60— and —61— of the corresponding brace bars preparatory to folding the mattress supporting frames upwardly and inwardly.

Operation.

When the trailer is being drawn from place to place, the mattress supporting frames are folded upwardly and inwardly against the stops —68— so that the rear end view presents an appearance shown in Fig. 4, in which the mattress supporting frames and bedding are all housed within the planes of the side rail —24— and top rail —25— and protected by the covering which, of course, will assume a more or less folded or wrinkled position, not indicated in the drawings, but held from undue sagging by said frames, while the bedding is held against sagging by the stops —68—, and may, if necessary, be strapped to the folding frames.

The covering is preferably unattached to the mattress supporting frames and is free to slide across the edges thereof when the latter are folded so as to hang down at the outer sides of the body, while the central portion is supported by the ridge beam —41—.

When the parts are in this normally folded position, the ridge beam —41— and ventilating flue —33— are lowered to approximately the horizontal plane of the top rail —25—, the height of which is approximately equal to the height of the top of the usual automobile or other car, and may, therefore, be housed in any place adapted to receive the automobile.

When the trailer is brought to the desired location selected for camping, it is simply necessary to push the upper edges of the mattress supporting frames with the bedding thereon outwardly beyond a vertical position, at which time they will drop freely by their own weight to a substantially horizontal position, this operation being effected from the inside of the trailer, if desired. During this operation, the cables —44— will be placed under tension or drawn outwardly and downwardly over the sheaves —45— and it will cause the elevation of the ridge beam supports —42— and ventilating flue —33— until limited by the engagement of the pins —48— with the lower guide lugs —43—, which assist in holding the outer edges of the mattress supporting frames against undue movement downward or in a substantially horizontal position, it being understood that when the mattress supporting frames are folded, the brace sections —60— and —61— are disconnected by withdrawing the sleeve —62— from the section —60—, and allowing said sections to assume the position shown by dotted lines in Fig. 3.

Immediately following the lowering of the mattress supporting frames, the adjacent ends of the brace sections are brought into alinement with each other by hand and the sleeves —62— are then adjusted to lock the sections of the brace bar together, thereby adjusting and holding the stay sections —55— in their upright positions aided by the adjustment of the brace bars —70—, the entire device being then ready for use. If the trailer is to be detached from the automobile or other source of power by which it is drawn to its destination, the legs —17— may be released by loosening the nuts —21— and allowing the feet of the legs to engage the surface of the ground, after which the nuts —21— may be retightened to hold the legs in their adjusted positions, whereby the body of the trailer will be supported at the four corners against tilting movement.

When it is desired to break camp, the sleeves —62— are first withdrawn from their locking positions and the sections —60— and —61— allowed to drop to the position shown by dotted lines in Fig. 3, after which the braces —70— may be flexed inwardly to release the stay frames —55— and to allow them with the braces to be folded inwardly and downwardly upon the mattress supporting frames, whereupon the latter may be rocked upwardly and inwardly into engagement with the limiting stops —68—.

The tongue of the trailer is then attached to the automobile or other attraction power and the legs —17— elevated and locked in their elevated positions, the trailer being then ready for transportation to any other locality desired.

Instead of allowing the covering to hang loosely along the outer faces of the folded mattress supporting frames, it is evident that any suitable means may be provided, such as ropes threaded through eyelets in the canvas covering for shirring the same around the bottom of the lateral extensions of the main body to firmly hold the canvas in place with the side portions thereof practically smooth across the outer surfaces of the mattress supporting frames, thereby presenting the appearance of a tent capable of shedding rain when the parts are folded for transportation.

What I claim is:

1. A camping outfit comprising a body having the opposite edges of its end walls inclining upwardly and inwardly from opposite sides thereof, mattress-supporting frames hinged to opposite sides of the body and normally folded against said rests, said frames being unfoldable to a substantially horizontal position, an over head ridge-pole along the longitudinal center of the body, supporting frames for the ridge-pole slidable vertically of and upon the end walls of the body, means for holding said supporting-frames in their elevated positions, a cover extending over the ridge-pole and mattress-supporting frames, and braces between the ridge-pole and outer edges of the mattress-supporting frames.

2. A camping outfit comprising a body, a ridge beam and supports therefor slidable vertically of and upon the body, mattress-supporting frames hinged to the body in planes at opposite sides of that of the ridge-beam, means actuated by the frames when unfolded for raising the said supports, and a cover centrally supported on the ridge-beam and having its lengthwise edges passed around the under side of the mattress-supporting frames and secured to opposite sides of the body below the hinges.

3. A camping outfit comprising a body, a ridge beam and supports therefor slidable vertically of and upon the body, mattress-supporting frames hinged to the body to swing vertically to and from a substantially horizontal position, cables actuated by said frames when unfolded for raising said supports, and a flexible covering passed over the ridge beam and around the free edges and under side of the frames and attached to the body.

4. A camping outfit comprising a main body having upright end walls, and a mattress-supporting frame hinged to one side of the body to swing from a normal position between the end walls to a substantially horizontal position mainly beyond the adjacent outer edges of said walls, a ridge beam movable vertically between the end walls, a cover resting on the ridge beam and extended over said frame, a ventilating flue suspended from the ridge beam and extending through an opening in the cover, and means actuated by the frame when unfolded for raising the ridge beam.

In witness whereof I have hereunto set my hand this 17th day of April, 1920.

WILLIAM E. SHERWOOD.

Witnesses:
   H. E. CHASE,
   ROSE G. CARROLL.